US005778866A

United States Patent [19]

Uchikawa

[11] Patent Number: 5,778,866

[45] Date of Patent: Jul. 14, 1998

[54] AIR-FUEL RATIO DETECTING SYSTEM OF INTERNAL COMBUSTION ENGINE

[75] Inventor: Akira Uchikawa, Omama, Japan

[73] Assignee: Unisia Jecs Corporation, Atsugi, Japan

[21] Appl. No.: 788,302

[22] Filed: Jan. 24, 1997

[51] Int. Cl.$^6$ .......................... F02D 41/14; G01N 27/416

[52] U.S. Cl. .......................... 123/682; 123/696; 73/1.06; 701/109

[58] Field of Search .................................... 123/675, 682, 123/694–696; 73/1.03, 1.06, 23.32; 364/431.062; 701/109

[56] References Cited

U.S. PATENT DOCUMENTS

| | | | |
|---|---|---|---|
| 4,502,444 | 3/1985 | Rubbo et al. | 123/695 |
| 5,036,819 | 8/1991 | Peter et al. | 123/694 |

OTHER PUBLICATIONS

Patent Abstracts of Japan, vol. 18, No. 194, (P1722), Apr. 5, 1994, for JP 6-3304 (Tomizawa et al), Jan. 11, 1994.

*Primary Examiner*—Andrew M. Dolinar
*Attorney, Agent, or Firm*—Foley & Lardner

[57] ABSTRACT

In an internal combustion engine equipped with electronically controlled fuel injection valves, there is provided an air-fuel ratio detecting system. The system comprises a wide range type air-fuel ratio sensor disposed in an exhaust pipe of the engine. The sensor issues an output voltage that varies continuously in accordance with an exhaust gas air-fuel ratio possessed by an exhaust gas in the exhaust pipe. The output voltage of the sensor is translated to an air-fuel ratio of air-fuel mixture with reference to a reference table. A variation characteristic of the output voltage of the sensor is decided relative to variation of the air-fuel ratio of air-fuel mixture. A correction data of the translated air-fuel ratio is formed with reference to the variation characteristic. The translated air-fuel ration is corrected with reference to the correction data.

5 Claims, 5 Drawing Sheets

AIR-FUEL RATIO DETECTING SYSTEM OF INTERNAL COMBUSTION ENGINE

BACKGROUND OF THE INVENTION

1. Field of the Invention

The present invention relates in general to operation control devices of internal combustion engines, and more particularly to air-fuel ratio detecting systems used in an electronically controlled fuel-injection device of an internal combustion engine.

2. Description of the Prior Art

As an air-fuel ratio detecting device of internal combustion engines, there has been widely used a so-called wide range type air-fuel ratio sensor whose output voltage varies continuously in accordance with an exhaust gas air-fuel ratio possessed by the exhaust gas. In this case, the air-fuel ratio of air-fuel mixture is derived by comparing the output voltage of the sensor with a reference table.

However, the air-fuel ratio sensor of such type has such a drawback that the output characteristic varies considerably for each product. Thus, it is difficult to find or derive the air-fuel ratio of air-fuel mixture precisely by only comparing the output voltage of the sensor with the reference table. Such drawback becomes much severe when the sensor is deteriorated.

SUMMARY OF THE INVENTION

It is therefore an object of the present invention to provide an air-fuel ratio detecting system of an internal combustion engine, which can detect the air-fuel ratio of air-fuel mixture precisely irrespective of usage of the wide range type air-fuel ratio sensor.

According to a first aspect of the present invention, there is provided an air-fuel ratio detecting system of an internal combustion engine, which comprises a wide range type air-fuel ratio sensor disposed in an exhaust pipe of the engine, the sensor issuing an output voltage that varies continuously in accordance with an exhaust gas air-fuel ratio possessed by an exhaust gas in the exhaust pipe; means for translating the output voltage of the sensor to an air-fuel ratio of air-fuel mixture; means for deciding a variation characteristic of the output voltage of the sensor relative to variation of the air-fuel ratio of air-fuel mixture; means for forming a correction data of the translated air-fuel ratio with reference to the variation characteristic; and means for correcting the translated air-fuel ratio with reference to the correction data.

According to a second aspect of the present invention, there is provided an air-fuel ration control device for use in an internal combustion engine equipped with electronically controlled fuel injection valves for injecting fuel to respective cylinders of the engine. The air-fuel ratio control device comprises a wide range type air-fuel ratio sensor disposed in an exhaust pipe of the engine, the sensor issuing an output voltage that varies continuously in accordance with an exhaust gas air-fuel ratio possessed by an exhaust gas in the exhaust pipe; a control unit that comprises means for translating the output voltage of the sensor to an air-fuel ratio of air-fuel mixture, means for deciding a variation characteristic of the output voltage of the sensor relative to variation of the air-fuel ratio of air-fuel mixture, means for forming a correction data of the translated air-fuel ratio with reference to the variation characteristic, and means for correcting the translated air-fuel ratio with reference to the correction data; and means for operating the fuel injection valves in accordance with the corrected translated air-fuel ratio prepared by the control unit.

According to the invention, the means for deciding the variation characteristic of the output voltage of the sensor derives a variation of the output voltage of the sensor between the time on which a fuel-cut operation starts and the time on which a given time has passed from the fuel-cut operation starting time.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail in an exemplified case wherein an air-fuel ratio detecting system of the invention is practically applied to an electronically controlled fuel injection device of an internal combustion engine.

Figure 1:
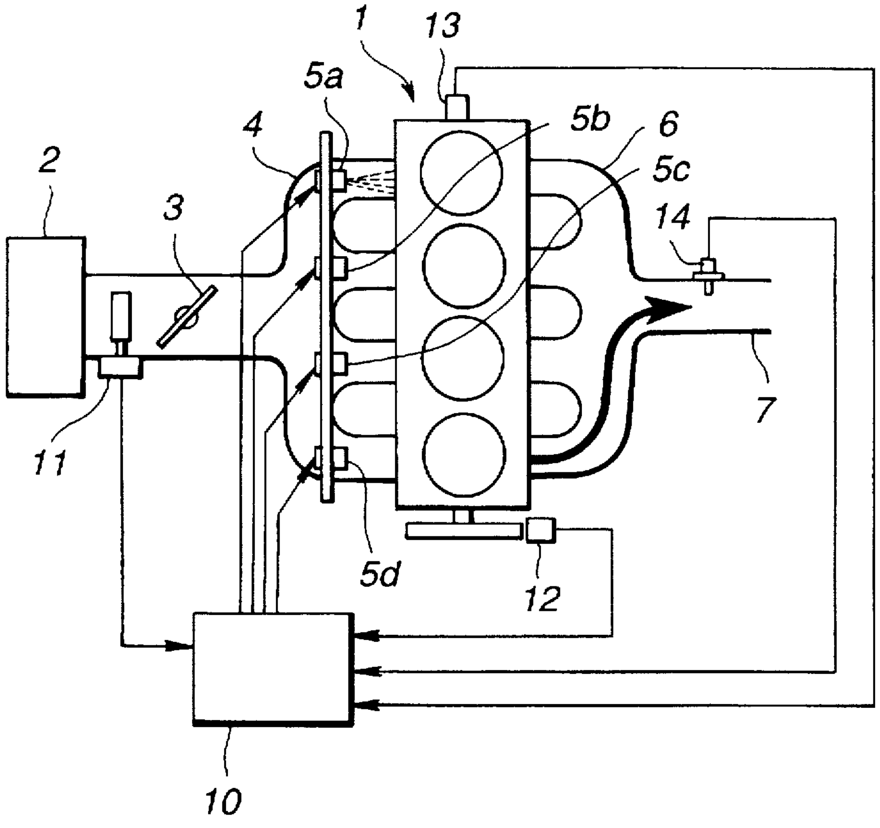
FIG. 1 is a drawing showing an internal combustion engine equipped with an electronically controlled fuel injection device to which an air-fuel ratio detecting system of the present invention is practically applied.

Referring to FIG. 1, there is shown an internal combustion engine 1 equipped with an electronically controlled fuel-injection device to which the present invention is practically applied.

The engine 1 is of an in-line four cylinder type, which has an air cleaner 2, a throttle valve 3 and an intake manifold 4 through which air is led to each of the cylinders. The intake manifold 4 is equipped at branches thereof with fuel injection valves *5a*, *5b*, *5c* and *5d*, so that the cylinders are fed with fuel from the valves *5a*, *5b*, *5c* and *5d* in given order respectively. Thus, each cylinder is fed with a combustible air-fuel mixture at certain intervals. Although not shown in the drawing, each cylinder is equipped with an ignition plug to ignite and combust the air-fuel mixture led thereinto. Combustion gas thus produced in the cylinders is led through an exhaust manifold 6 to an exhaust pipe 7. Although not shown in the drawing, a catalytic converter is arranged in the exhaust pipe 7 to make the exhaust gas harmless before it is discharged to the open air.

The fuel injection valves *5a*, *5b*, *5c* and *5d* are of an electromagnetic type that opens when energized and closes when deenergized. Operation of each valve *5a*, *5b*, *5c* or *5d* is controlled by a drive pulse signal issued from a control unit 10. That is, the amount of fuel injected by each fuel injection valve *5a*, *5b*, *5c* or *5d* is decided by the pulse width of the drive pulse signal. Thus, by controlling the amount of injected fuel by adjusting the pulse width of the signal, the air-fuel ratio of the air-fuel mixture can be adjusted.

For adjusting the air-fuel ratio of the mixture, information signals are fed to the control unit 10 from an air flow meter 11, a crank-angle sensor 12, an engine temperature sensor 13 and an air-fuel ratio sensor 14. The air flow meter 11 measures the amount "Q" of air directed toward the throttle valve 3. The crank-angle sensor 12 outputs both a reference crank-angle signal and a unit crank-angle signal. As is known, the engine speed "N" is derived from the cycle of the reference crank-angle signal. The engine temperature sensor 13 senses the temperature of cooling water flowing in a water jacket in the engine 1.

As is seen in the drawing (FIG. 1), the air-fuel ratio sensor 14 is placed at or at least near a united portion of branches of the exhaust manifold 6. The sensor 14 is of the wide range type whose output voltage varies continuously in accordance with the air-fuel ratio possessed by the exhaust gas. That is, the sensor 14 can widely sense a rich/lean condition of the exhaust gas, and thus, that of air-fuel mixture fed to each cylinder. For this sensing, the sensor 14 comprises a so-called oxygen pump part of $ZrO_2$ and a so-called $\lambda=1$ detecting part. Based on a signal from the $\lambda=1$ detecting part, the direction in which the voltage is applied to the oxygen pump part is changed.

Figure 2:
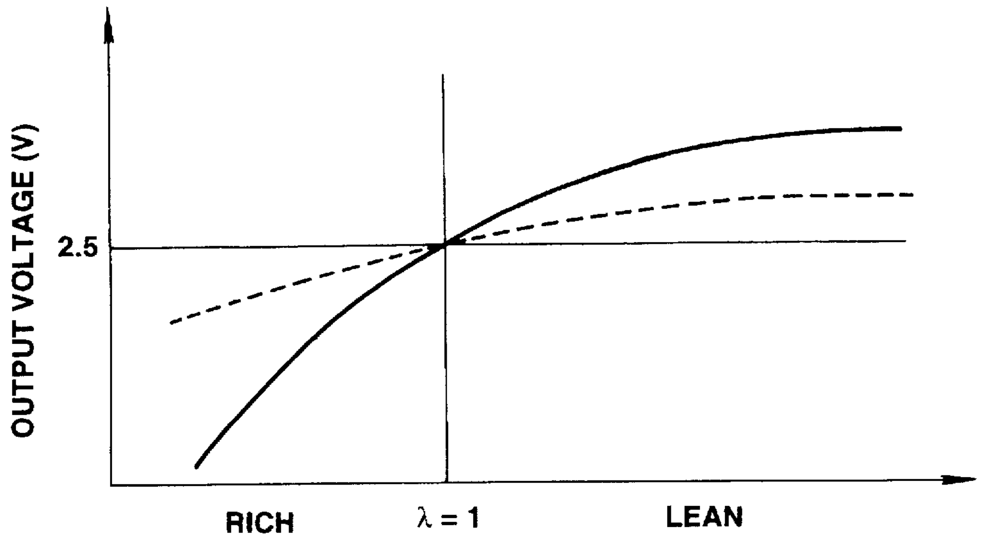
FIG. 2 is a graph showing an output characteristic of a commonly used wide range type air-fuel ratio sensor.

The characteristic of the air-fuel ratio sensor 14 is shown in the graph of FIG. 2. That is, the graph depicts the behavior of an output voltage (V) of the sensor 14 with respect to the change of the air-fuel ratio ($\lambda$). Since, as is described hereinabove, the sensor 14 shows a considerable variation in output characteristic for each product, the output voltage in the case of $\lambda=1$ is adjusted to a predetermined voltage (for example, 2.5V) with an aid of an adjusting resistor. However, due to the nature, the rising rate (that is, the changing rate) of the output voltage can not be adjusted. Accordingly, various characteristic curves are inevitably produced from respective air-fuel ratio sensors of the wide range type. In the graph of FIG. 2, the output characteristic shown by a solid curve is a standard one, while, the output characteristic shown by a dotted curve is obtained when the sensor deteriorates. As shown, the rising rate of the dotted curve is small as compared with that of the standard one.

Figure 3:
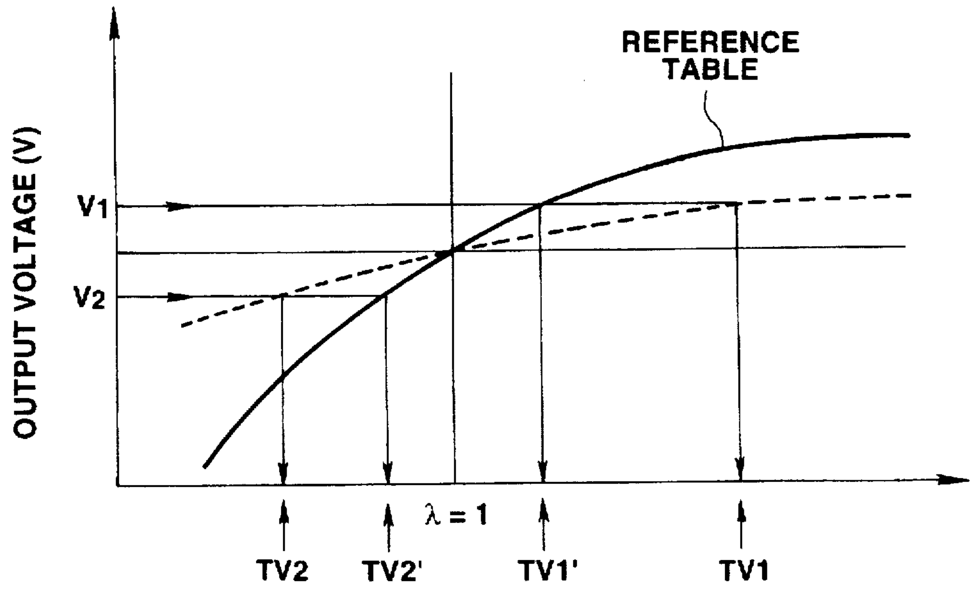
FIG. 3 is a reference table depicting a drawback possessed by the commonly used wide range type air-fuel ratio sensor.

Accordingly, if the solid curve of standard characteristic is used as a reference curve for looking up the air-fuel ratio of air-fuel mixture, the following undesired matter tends to occur when the air-fuel ratio sensor 14 is of the type that exhibits the output characteristic of the dotted curve. That is, as is understood from a reference table of FIG. 3, even when the sensor 14 issues an output voltage "V1" representing that the true air-fuel ratio "$\lambda$" of the exhaust gas is "TV1", the reference curve translates the true ratio to "TV1", and furthermore, even when the sensor 14 issues an output voltage "V2" representing that the true air-fuel ratio "[0"] is "TV2", the reference curve translates the true ratio to "TV2". As is seen from the table, the translated values "TV1" and "TV2" are nearer "1" than the true values "TV1" and "TV2". Of course, in this case, precise detection of the air-fuel ratio of air-fuel mixture is not expected.

In the present invention, the above-mentioned undesired matter is solved by unique operation steps executed by a microcomputer.

The control unit 10 has a microcomputer installed therein. The microcomputer processes the routines shown in FIGS. 4 to 6. That is, as will be described in the following, with work of the computer, an amount "TI" of fuel injected to each cylinder is derived, and for carrying out the fuel injection, a drive pulse signal having a pulse width corresponding to the amount "TI" is outputted to each fuel injection valve 5*a*, 5*b*, 5*c* or 5*d* at a given timing in synchronization with the stroke of the corresponding cylinder. It is to be noted that in a certain speed reduction mode, a fuel cut operation is carried out for the fuel save.

Figure 4:
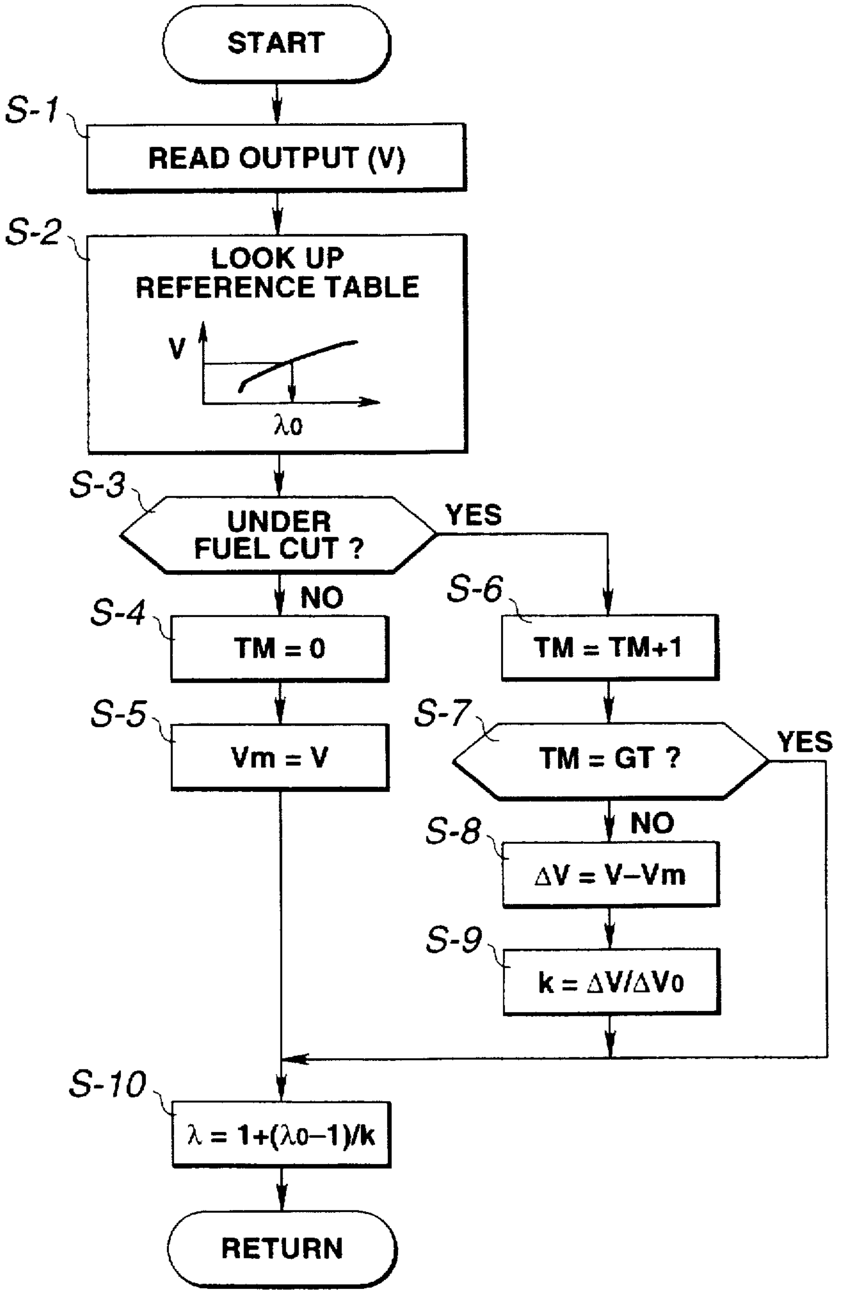
FIG. 4 is a flowchart showing a routine of deriving an air-fuel ratio of air-fuel mixture.

In FIG. 4, there is shown a flowchart showing programmed operation steps for deriving a true air-fuel ratio in air-fuel mixture. The routine of these steps is executed at given intervals.

At step S-1, the output voltage (V) of the air-fuel ratio sensor 14 is read. Then, at step S-2, with reference to a reference table, the output voltage (V) is translated to an air-fuel ratio "$\lambda_0$". The reference table has been provided by using the standard output characteristic depicted by the solid curve of FIG. 2. At step S-3, a judgment is carried out as to whether the associated engine is under a fuel cut operation or not.

If NO, that is, when the engine is not under the fuel cut operation, the flow goes to step S-4, and a timer "TM" is reset (that is, TM=0). Then, at step S-5, the existing output voltage "V" of the sensor 14 is memorized as "Vm" (that is, Vm=V). Then, the flow goes to step S-10 described below.

If YES at step S-3, that is, when the engine is under the fuel cut operation, the flow goes to step S-6 and an increment takes place in the timer "TM" (that is, TM=TM+1). Then, at step S-7, a judgment is carried out as to whether "TM" reaches a predetermined value "GT" or not, that is, as to whether or not a given time has passed from the time of fuel cut starting. If YES, that is, if the judgment is so made that the given time has passed, the flow goes to step S-8 and step S-9.

At step S-8, the following subtraction is carried out for deriving a variation "ΔV" of the output voltage of the sensor 14 from the starting time of the fuel cut operation to the time when the given time has passed:

$$\Delta V=V-Vm \qquad (1)$$

wherein:

V: existing output voltage of sensor 14

Vm: output voltage memorized just before starting of fuel cut operation

The existing output voltage "V" is the voltage appearing at the time when the given time has passed from the fuel cut starting.

It is to be noted that the value "ΔV" is a factor for representing the output characteristic of the sensor 14.

At step S-9, the following calculation is carried out for deriving a correction factor "k":

$$k=\Delta V/\Delta V_0 \qquad (2)$$

wherein:

$\Delta V_0$: predetermined reference variation of output voltage

The reference variation "$\Delta V_0$" is a value which is predetermined based on the above-mentioned standard output characteristic of the sensor. However, if the invention is focused to take a measure against deterioration of the sensor, the reference variation "$\Delta V_0$" may be a value determined based on an output characteristic that appears when the sensor is still new.

Then, the flow goes to step S-10. At this step, the following calculation is carried out to derive or estimate the air-fuel ratio of air-fuel mixture:

$$\lambda=1+(\lambda_0-k)/k \qquad (3)$$

That is, the air-fuel ratio "$\lambda$" of air-fuel mixture is derived by correcting the translated air-fuel ratio "$\lambda_0$" with reference to the correction factor "k".

As is seen from the above-mentioned steps, when the sensor 14 deteriorates and thus the rising rate of the characteristic curve of the sensor is relatively small (see the dotted curved of FIG. 2), there is established an inequality "$\Delta V<\Delta V_0$". In this case, there is established a relation "$k=\Delta V/\Delta V_0<1$". Accordingly, when "$\lambda_0$" is greater than "1" (that is, $\lambda_0>1$, thus, in a lean condition), there is established an inequality "$\lambda>\lambda_0$", while, when "$\lambda_0$" is smaller than "1" (that is, $\lambda_0<1$, thus, in a rich condition), there is established an inequality "$\lambda<\lambda_0$". Thus, the true air-fuel ratio "|0 " |is precisely detected.

It is to be noted that until the time when the correction factor "k" has not been derived, the correction factor "k" is set to "1" (that is, k=1). In this case, there is established equality "$\lambda=\lambda_0$".

Figure 5:
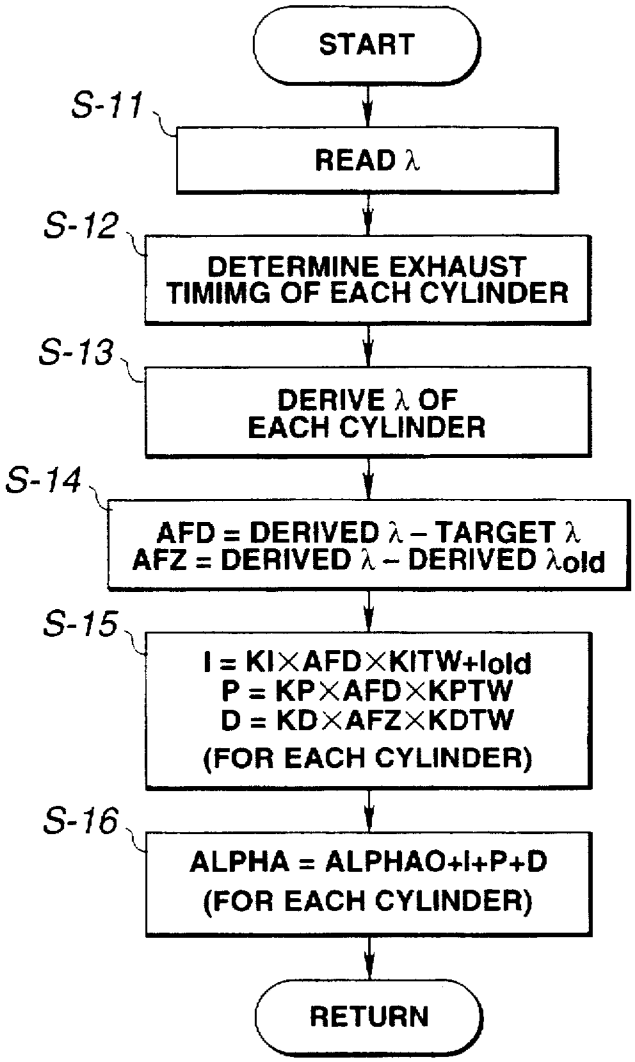
FIG. 5 is a flowchart showing a routine of deriving a corrected value (or correction factor) for each cylinder.

In FIG. 5, there is shown a flowchart showing programmed operation steps for deriving a corrected value for each cylinder, which is used for carrying out an air-fuel ratio feedback control for each cylinder. The routine of these steps is executed at given intervals.

At step S-11, the estimated air-fuel ratio "λ" of air-fuel mixture is read as time series data. At step S-12, based on an information signal from the crank-angle sensor 12, the exhaust timing of each cylinder is determined. At step S-13, with reference to both the time series data of "λ" and the exhaust timing of each cylinder, the air-fuel ratio "λ" of each cylinder is derived. To derive the air-fuel ratio "λ" of each cylinder, the residence time of the exhaust gas in each cylinder, the distance from each cylinder to the air-fuel ratio sensor 14, the responsibility of the sensor and the air-fuel ratio fluctuation detecting accuracy of the sensor are all considered.

At step S-14, based on the derived air-fuel ratio "λ" (that is, "derived λ") for each cylinder, an air-fuel ratio gap is derived for each cylinder. That is, by using the following equations, a difference "AFD" between the "derived λ" and a "target λ" and a difference "AFZ" between the existing "derived A" and a previously "derived A" are obtained.

$$AFD=\text{derived } \lambda-\text{target } \lambda \quad (4)$$

$$AFZ=\text{derived } \lambda-\text{derived } \lambda_{old} \quad (5)$$

At step S-15, based on the differences "AFD" and "AFZ", an integration part "I", a proportion part "P" and a differential part "D" are derived by using the following equations, which are control constants:

$$I=KI\times AFD\times KITW+I_{old} \quad (6)$$

$$P=KP\times AFD\times KPTW \quad (7)$$

$$D=KD\times AFX\times KDTW \quad (8)$$

wherein:

KI, KP & KD: constant $I_{old}$: previous integration part

KITW, KPTW & KDTW: correction factor based on cooling water temperature sensed by sensor 13

It is to be noted that each correction factor KITW, KPTW or KDTW takes "1" when the cooling water has an ordinary temperature, but takes a value smaller than "1" when the cooling water has a temperature other than the ordinary temperature.

At step S-16, based on the integration part "I", proportion part "P" and differential part "D", the corrected value "ALPHA" for each cylinder is derived by using the following equation:

$$ALPHA=ALPHA0+I+P+D \quad (9)$$

wherein:

ALPHA0: predetermined value

Figure 6:
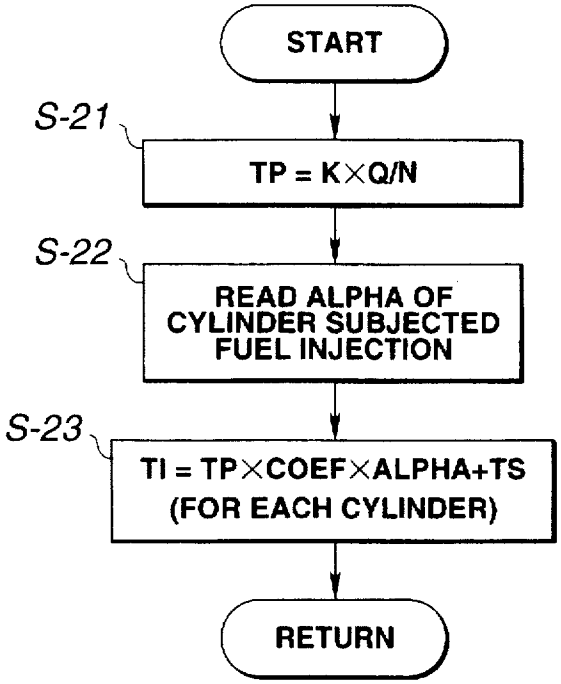
FIG. 6 is a flowchart showing a routine of deriving the amount of fuel injected into each cylinder.

In FIG. 6, there is shown a flowchart showing programmed operation steps for deriving the fuel injection amount for each cylinder. The routine of these steps is executed at given intervals.

At step S-21, based on the intake air amount "Q" sensed by the air flow meter 11 and the engine speed "N" sensed by the crank-angle sensor 12, a basic fuel injection amount "TP" is derived from the following equation:

$$TP=K\times Q/N \quad (10)$$

wherein:

K: constant

At step S-22, a cylinder subjected to a fuel injection is judged and the corrected value "ALPHA" of the cylinder is read.

At step S-23, by using the following equation, the fuel injection amount "TI" for each cylinder is derived:

$$TI=TP\times COEF\times ALPHA+TS \quad (11)$$

wherein:

COEF: various correction factors including a correction factor of cooling water temperature TS: correction factor based on voltage of battery (correction factor of the time for which invalid fuel injection is carried out)

When the fuel injection amount "TI" for each cylinder is derived in the above-mentioned manner, the control unit 10 (see FIG. 1) timely feeds each fuel injection valve 5a, 5b, 5c or 5d with a drive pulse signal whose pulse width corresponds to the amount "TI". With this, fuel injection is timely applied to the cylinders one after another in accordance with the stroke of each cylinder.

In the following, modifications of the invention will be described.

In the above-mentioned embodiment, the variation "ΔV" of the output voltage of the air-fuel ratio sensor is derived between the time on which the fuel cut operation starts and the time on which a given time has passed from the fuel cut starting time. However, if desired, the following modification may be employed. That is, in the modification, "$\lambda=\lambda_0$" is made at step S-5 of FIG. 4, "$\Delta\lambda=\lambda_0-\lambda_m$" is made at step S-8 and "$k=\Delta\lambda/\Delta\lambda_0$" is made at step S-9.

Furthermore, in place of using the above-mentioned variation "ΔV" of the output voltage of the air-fuel ratio sensor, the following modification may be employed. That is, in this modification, the value of the adjusting resistor for adjusting the output voltage of the sensor in the case of λ=1 is read, and based on the value thus read, a correction data is provided. In providing the correction data, a correction table for the reference table may be used in addition to deriving of the correction factor "k". Furthermore, if desired, the reference table may be changed.

What is claimed is:

1. An air-fuel ratio detecting system of an internal combustion engine comprising:

a wide range type air-fuel ratio sensor disposed in an exhaust pipe of the engine, said sensor issuing an output voltage that varies continuously in accordance with an exhaust gas air-fuel ratio possessed by an exhaust gas in the exhaust pipe;

means for translating the output voltage of the sensor to an air-fuel ratio of air-fuel mixture;

means for deciding a variation characteristic of the output voltage of the sensor relative to variation of the air-fuel ratio of air-fuel mixture;

means for forming a correction data of the translated air-fuel ratio with reference to said variation characteristic; and means for correcting the translated air-fuel ratio with reference to said correction data, wherein the means for deciding the variation characteristic of the output voltage of the sensor derives a variation of the output voltage of the sensor between the time on which a fuel-cut operation starts and the time on which a given time has passed from the fuel-cut operation starting time.

2. An air-fuel ratio detecting system as claimed in claim 1, wherein the means for forming the correction data forms the correction data with reference to a ratio between a predetermined reference value of the variation of the output voltage of the sensor and the actually decided value of the variation of the output voltage.

3. An air-fuel ratio detecting system as claimed in claim 1, wherein the means for translating the output voltage of the sensor to the air-fuel ratio of air-fuel mixture is carried out with reference to a reference table.

4. In an internal combustion engine equipped with electronically controlled fuel injection valves for injecting fuel to respective cylinders of the engine, an air-fuel ratio control device comprising:

a wide range type air-fuel ratio sensor disposed in an exhaust pipe of the engine, said sensor issuing an output voltage that varies continuously in accordance with an exhaust gas air-fuel ratio possessed by an exhaust gas in the exhaust pipe;

a control unit comprising means for translating the output voltage of the sensor to an air-fuel ratio of air-fuel mixture, means for deciding a variation characteristic of the output voltage of the sensor with respect to variation of the air-fuel ratio of air-fuel mixture, means for forming a correction data of the translated air-fuel ratio with reference to said variation characteristic, and means for correcting the translated air-fuel ratio with reference to said correction data; and means for operating said fuel injection valves in accordance with the corrected translated air-fuel ratio prepared by said control unit, wherein the means for deciding the variation characteristic of the output voltage of the sensor derives a variation of the output voltage of the sensor between the time on which a fuel-cut operation starts and the time on which a given time has passed from the fuel-cut operation starting time.

5. An air-fuel ration detecting system as claimed in claim 4, wherein the means for translating the output voltage of the sensor to the air-fuel ratio of air-fuel mixture is carried out with reference to a reference table.

* * * * *

UNITED STATES PATENT AND TRADEMARK OFFICE

CERTIFICATE OF CORRECTION

PATENT NO. : 5,778,866
DATED : July 14, 1998
INVENTOR(S) : Akira Uchikawa

It is certified that error appears in the above-identified patent and that said Letters Patent is hereby corrected as shown below:

Title page, item [30], under Foreign Application Priority Data add--
Jan. 25, 1996 [JP] Japan.......8-11216--.

Signed and Sealed this

Ninth Day of March, 1999

Attest:

DICKINSON

*Attesting Officer* *Acting Comm... of Patents and Trademarks*